United States Patent [19]

Hauck et al.

[11] Patent Number: 5,058,145

[45] Date of Patent: Oct. 15, 1991

[54] SYSTEM FOR DETERMINING THE POSITION OF MOVABLE MACHINE PARTS

[75] Inventors: Dieter Hauck, Eberbach; Karl-Heniz May, Viernheim; Hans Müller, Sandhausen; Jürgen Rehberger, Dossenheim, all of Fed. Rep. of Germany

[73] Assignee: Heidelberger Druckmaschinen AG, Heidelberg, Fed. Rep. of Germany

[21] Appl. No.: 348,986

[22] Filed: May 8, 1989

[30] Foreign Application Priority Data

May 6, 1988 [DE] Fed. Rep. of Germany ....... 3815534

[51] Int. Cl.[5] .................... H03K 21/40; H03K 21/02; H03M 1/30; G01P 3/44
[52] U.S. Cl. ........................ 377/17; 377/28; 377/43; 377/45; 377/47; 377/55; 324/166; 364/565
[58] Field of Search ........... 377/17, 39, 28, 29, 377/39, 43, 45, 47, 52, 55, 114, 116; 307/514, 515, 309; 328/5; 324/166, 173, 207.15, 207.16; 364/565

[56] References Cited

U.S. PATENT DOCUMENTS

| | | | |
|---|---|---|---|
| 3,935,537 | 1/1976 | Batchelor | 324/166 |
| 4,129,862 | 12/1978 | Kaplan et al. | 377/17 |
| 4,135,082 | 11/1979 | Bozders, Jr. et al. | 377/39 |
| 4,158,129 | 6/1979 | Baumgartner | 377/39 |
| 4,171,522 | 10/1979 | Powell | 377/17 |
| 4,308,500 | 12/1981 | Avins | 307/514 |
| 4,394,609 | 7/1983 | Janicki et al. | 377/39 |
| 4,442,532 | 4/1984 | Takemura | 307/515 |
| 4,475,086 | 10/1984 | Allen | 377/45 |
| 4,475,163 | 10/1984 | Chandler et al. | 377/17 |
| 4,714,913 | 12/1987 | Cohen | 377/17 |
| 4,839,834 | 6/1989 | Omae et al. | 324/166 |
| 4,881,248 | 11/1989 | Kozechika | 377/17 |
| 4,982,413 | 1/1991 | Hauck et al. | 377/17 |

FOREIGN PATENT DOCUMENTS

| | | |
|---|---|---|
| 20853/67 | 10/1968 | Australia . |
| 78840/75 | 9/1976 | Australia . |
| 6198486 | 2/1987 | Australia . |
| 3219894 | 8/1984 | Fed. Rep. of Germany . |
| 3318351 | 5/1986 | Fed. Rep. of Germany . |
| 2930793 | 3/1988 | Fed. Rep. of Germany . |
| 0287320 | 12/1986 | Japan ........ 377/17 |
| 2002123 | 2/1979 | United Kingdom . |
| 2065399 | 6/1981 | United Kingdom . |
| 8202631 | 8/1982 | World Int. Prop. O. ......... 377/17 |

OTHER PUBLICATIONS

"Measurement Systems—Application and Design" from Ernest O. Doebelin, McGraw-Hill Book Company, p. 280.

Primary Examiner—Stanley D. Miller
Assistant Examiner—Tai V. Duong
Attorney, Agent, or Firm—Herbert L. Lerner; Laurence A. Greenberg

[57] ABSTRACT

A system for determining the position of movable machine parts including an incremental pulse generator for generating angular-speed pulses includes a computer. At least one counting circuit via which the incremental pulse generator is connected to the computer counts the generated angular-speed pulses.

7 Claims, 5 Drawing Sheets

SYSTEM FOR DETERMINING THE POSITION OF MOVABLE MACHINE PARTS

The invention relates to a system for determining the position of movable machine parts, especially the angular position of rotating parts of a printing machine, including an incremental pulse generator for generating angular speed pulses which are counted.

When controlling machines by means of computers, it is often necessary to determine the position of movable machine parts and to release or initiate specific operations at given positions. Thus, a machine can be stopped, for example, when a given position has been attained. Furthermore, further functions and operations can be synchronously controlled during the running of the machine. This can require a considerable part of the capacity of the computer which is available, especially in the case of printing machines. In this regard, continuous monitoring of the machine position demands considerable computer time, especially if the respective position is to be determined with great accuracy in a rapidly running printing machine.

It is accordingly an object of the invention to provide a system for determining the position of movable machine parts, especially the angular position of rotating parts of a printing machine, wherein the least possible loading of the computer occurs in spite of a high resolution and/or high machine speed.

With the foregoing and other objects in view, there is provided, in accordance with the invention, a system for determining the position of movable machine parts, including an incremental pulse generator for generating angular-speed pulses, comprising a computer, and at least one counting circuit via which the incremental pulse generator is connected to the computer for counting the generated angular-speed pulses.

This has the advantage that the computer does not have to process every angular-speed pulse.

In accordance with another feature of the invention, there is provided a comparator having respective inputs connected to an output of the counting circuit for receiving a count signal therefrom, and to an output of the computer for receiving a given value signal therefrom, the comparator having an output connected to another input of the computer for feeding a program-interrupt signal thereto.

This feature, in an advantageous manner, permits the computer to operate without program interruption after a given position has been determined and after a further given position has been delivered or has issued, until the machine has reached the further given position. Considerably more computer time is thereby made available for the actual control functions of the computer.

In accordance with a further feature of the invention, the system includes means for deriving further pulses having a frequency which is a given multiple of the frequency of the angular-speed pulses, and wherein the one counting circuit has means for receiving and counting the further pulses instead of the angular-speed pulses.

In accordance with an added feature of the invention, the counting circuit includes a plurality of counters, and including means for deriving further pulses having a frequency which is a given multiple of the frequency of the angular-speed pulses, the incremental pulse generator being connected to at least one of the counters for delivering output signals thereto forming high-value digits of the count, the means for deriving further pulses being connected to a further one of the counters for delivering an output signal thereto forming low-value digits of the count.

With the foregoing features, a very high resolution is being achieved in the determination of the position without having to change the incremental pulse generator, which may be formed, for example, as an optical index plate. Furthermore, the derivation and evaluation of the further pulses can be discontinued or cut off at high machine speeds.

In accordance with an additional feature of the invention, the counting circuit has a plurality of counters, and at least one of the counters is respectively incremented and decremented both from front edges and rear edges of the angular-speed pulses of two phase-shifted angular-speed signals.

This results in an increase in the resolution.

In accordance with yet another feature of the invention, the system includes a device for measuring the speed of the machine, the computer having means for computing the frequency of the further pulses.

The further pulses can thereby be derived in an advantageous manner.

In accordance with yet a further feature of the invention, a system is provided wherein the incremental pulse generator is capable of generating two angular-speed pulses shifted 90° out of phase from one another, and there is provided a combinatorial circuit connected to the counting circuit and via which the two 90° phase-shifted angular-speed pulses are fed to the counting circuit.

With the aid of this feature, the reliability of the system according to the invention is improved with respect to disturbances which occur in the region of the incremental pulse generator and the leads.

In addition, in accordance with a concomitant feature of the invention, the system includes means for combining the angular-speed pulses in the combinatorial circuit in a manner that the angular-speed pulses are counted only if a permissible combination of the angular-speed pulses exists.

Other features which are considered as characteristic for the invention are set forth in the appended claims.

Although the invention is illustrated and described herein as embodied in a system for determining the position of movable machine parts, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Like parts in the figures are identified by the same reference characters.

Figure 1:
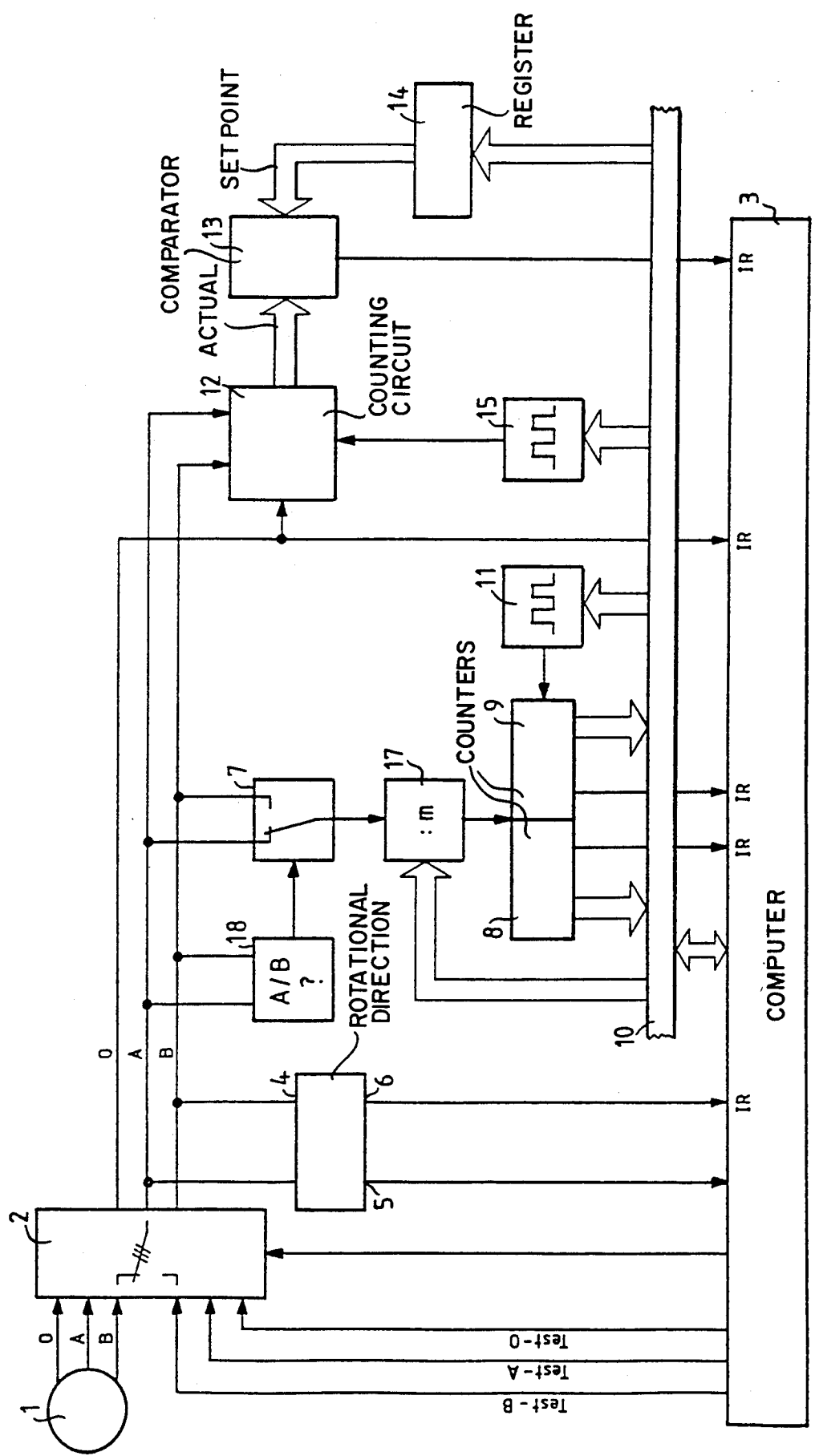
FIG. 1 is a block-diagram of a device for evaluating angular-speed signals in accordance with the invention.

Referring now to the drawings and, first, more specifically to FIG. 1 thereof, there is shown therein an incremental pulse generator 1. Incremental pulse generators of this type may be formed, for example, of a graduated index plate provided with optical markings, which is scanned by optoelectric receivers. In this connection, one of the optoelectric receivers emits a pulse 0 during one revolution. Furthermore, angular-speed signals A and B are generated, which are sinusoidal or wave-shaped and are shifted 90° out of phase with one another. In a conventional incremental pulse generator, the angular-speed signals A and B respectively encompass 1,024 pulses per revolution.

The angular speed-speed signals 0, A and B are fed to inputs of a changeover switch 2, which has further inputs which electronically generated test signals Test-0, Test-A and Test-B are applied. The changeover switch 2 is controllable by a computer 3 so that, in a test operating mode, the switching operations described hereinafter can be tested also with the machine at a standstill.

The angular-speed signals A and B are evaluated in order to detect the direction of rotation and the position as well as in order to measure the speed and rotational speed, respectively. In order to detect the direction of rotation, the angular-speed signals A and B are fed to a circuit 4. The circuit 4 has two outputs 5 and 6, the output 5 supplying a signal for identifying the direction of rotation, and the output 6 supplying a pulse when there is a change in the direction of rotation. While the direction-of-rotation identification signal is being fed to a data input of the computer 3, the pulse at the output 6 generates a program interrupt (IR).

The rotational speed is measured by two counters 8 and 9, which are supplied via a changeover switch 7 and a frequency divider 17 with one of the angular-speed signals A and B, respectively.

In this connection, the changeover switch 7 is controlled by a circuit 18 in a manner that, if one of the angular-speed signals A and B should fail, the other signal would be passed on. The frequency divider 17 is programmable, for which purpose the respective divider ratio is fed from the computer 3 via a data bus 10. The counters 8 and 9 are supplied by an oscillator 11 with a reference signal having a frequency, in accordance with the extent of resolution of the rotational-speed measurement, which is considerably higher than the frequency of the angular-speed signals. In order also to obtain at high rotational speeds a high degree of resolution of the rotational-speed measurement without any overflow of the counters 8 and 9 at low rotational speeds, the frequency of the reference signal can be varied. For this purpose, an appropriate value is supplied via the bus system 10 to the oscillator 11 for the reference signal.

The rotational speed is measured so that, in an alternating manner, one of the counters 8, 9 counts the pulses of the reference signal between two pulses generated by the frequency divider 17. After the counting is finished, a program interrupt (IR) is triggered, whereupon the computer 3 reads the count via the data bus 10. In the interim, the other counter 8, 9 has already been started, so that the duration of each period of the output signals from the frequency divider 17 is measured. The measured values are converted in the computer 3 into rotational-speed values.

Because a program interrupt is triggered each time to enable the computer 3 to read the count, other program sequences in the computer become disrupted thereby. In order to prevent these disruptions from occurring too frequently, the frequency of the angular-speed signals A and B, at higher rotational speeds, is divided, as described hereinbefore. Details in this regard are described hereinafter in conjunction with FIGS. 8 and 9. The data bus 10 and the computer 3 are represented in greatly simplified form, because suitable circuits and components therefor are sufficiently known.

In order to detect the position, the angular-speed signals A and B and the pulse 0 are fed to a counter circuit 12. In addition, provision is made for the pulse 0 to trigger a program interrupt. The counter circuit 12 is reset by the pulse 0, so that the count gives the position and rotational angle, respectively, with reference to a starting position. In the device according to FIG. 1, this value is fed as an actual position to a comparator 13, where it is compared with a nominal or setpoint position which has been previously written to a register 14 by the computer 3. When the machine has reached the setpoint position, both the actual and nominal values are identical and the comparator 13 triggers a program interrupt, whereupon the computer 3 initiates measures or actions which have been planned for the setpoint position. Directly thereafter, a new setpoint position can be introduced via the register 14. Until the machine reaches this new setpoint position, it is unnecessary for the position of the machine to be continuously measured in the computer 3.

In order to increase the extent or degree of resolution in the measurement of the position, the counter circuit 12 may be supplied with additional pulses from an additional-pulse generator or oscillator 15, the frequency of the additional pulses corresponding to a multiple of the frequency of the angular-speed signals. For this purpose, the oscillator 15 is controlled by a computer 3 based upon the frequency measurement with the aid of the circuits 7 to 11. The counting of the additional pulses yields the less significant figures of the actual position which is fed to the comparator 13. Due to the inertia of the machine, the frequency of the angular-speed signals does not change all too rapidly, so that the frequency measurement and, accordingly, the control of the oscillator 15 occur with sufficient accuracy for the subsequent periods of the angular-speed signal.

Figure 2:
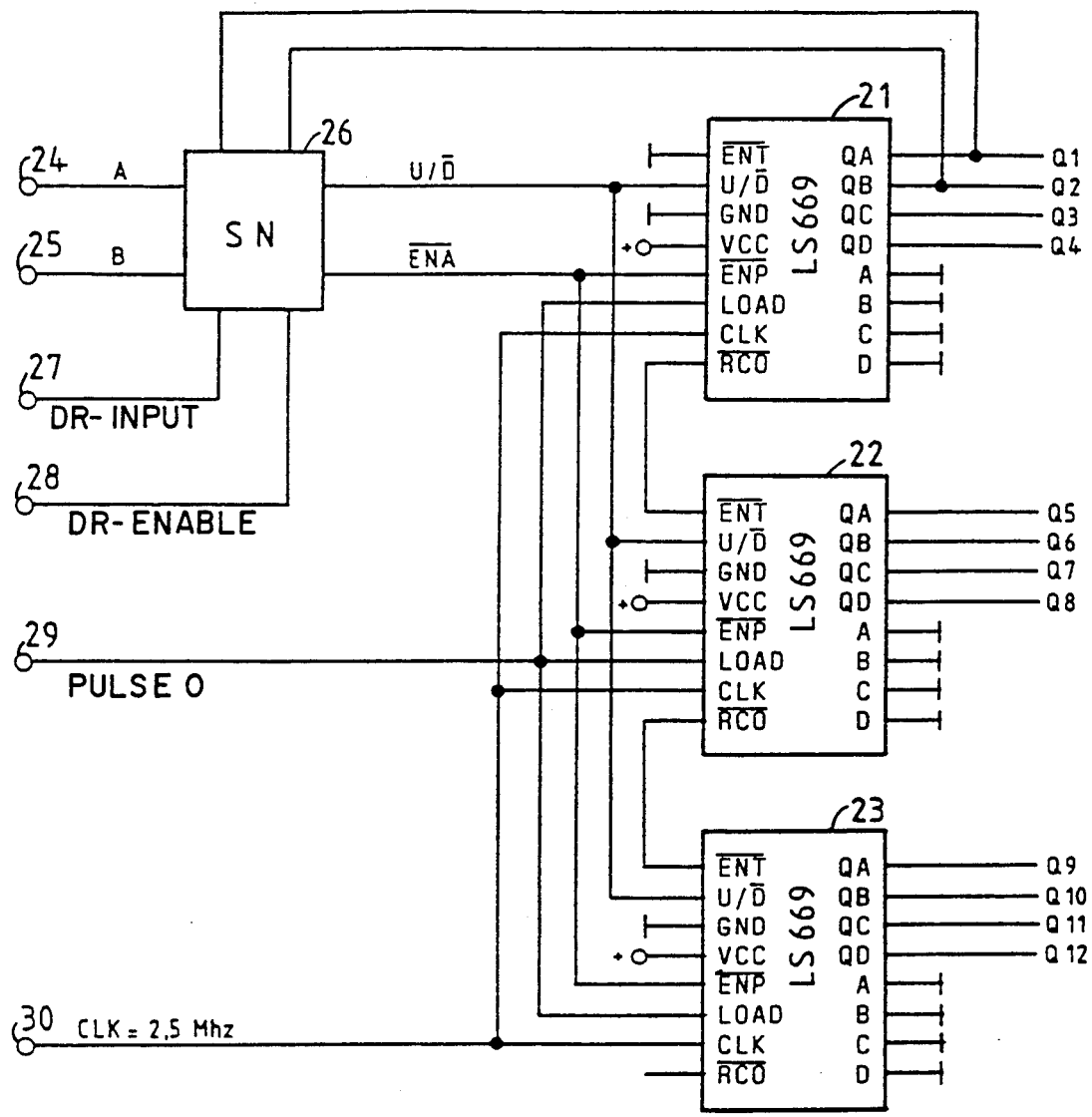
FIG. 2 is the circuit of a counter forming part of the device according to FIG. 1.

FIG. 2 illustrates diagrammatically an embodiment of the counter circuit 12 (FIG. 1) in which three 4-bit counters 21, 22 and 23 of the type LS 669 are provided. Carry outputs of the counters 21 and 22 are connected to inputs of the counters 22 and 23, so that the overall result is a 12-bit counter. The angular speed signals A and B are fed via inputs 14 and 25, respectively, to a combinatorial circuit 26 from which, through logical combination with the two less significant figures Q1 and Q2 of the count, and up/down signal U/D and a counter-enabling signal $\overline{ENA}$ are derived. In addition, the combinatorial circuit 26 is supplied via inputs 27 and 28 with the signals DR-input and DR-enable. The signal DR-input represents the direction of rotation of the machine. The signal DR-enable signifies whether the rotational speed of the machine is above or below a rotational speed at which a change in direction can take place. A further input 29 is provided for the pulse 0, which controls the LOAD input and thus resets the counters, because the data inputs A to D are at frame or ground potential. Finally, the counter circuit 12 has an input 30 for a clock signal CLK.

Figure 3:
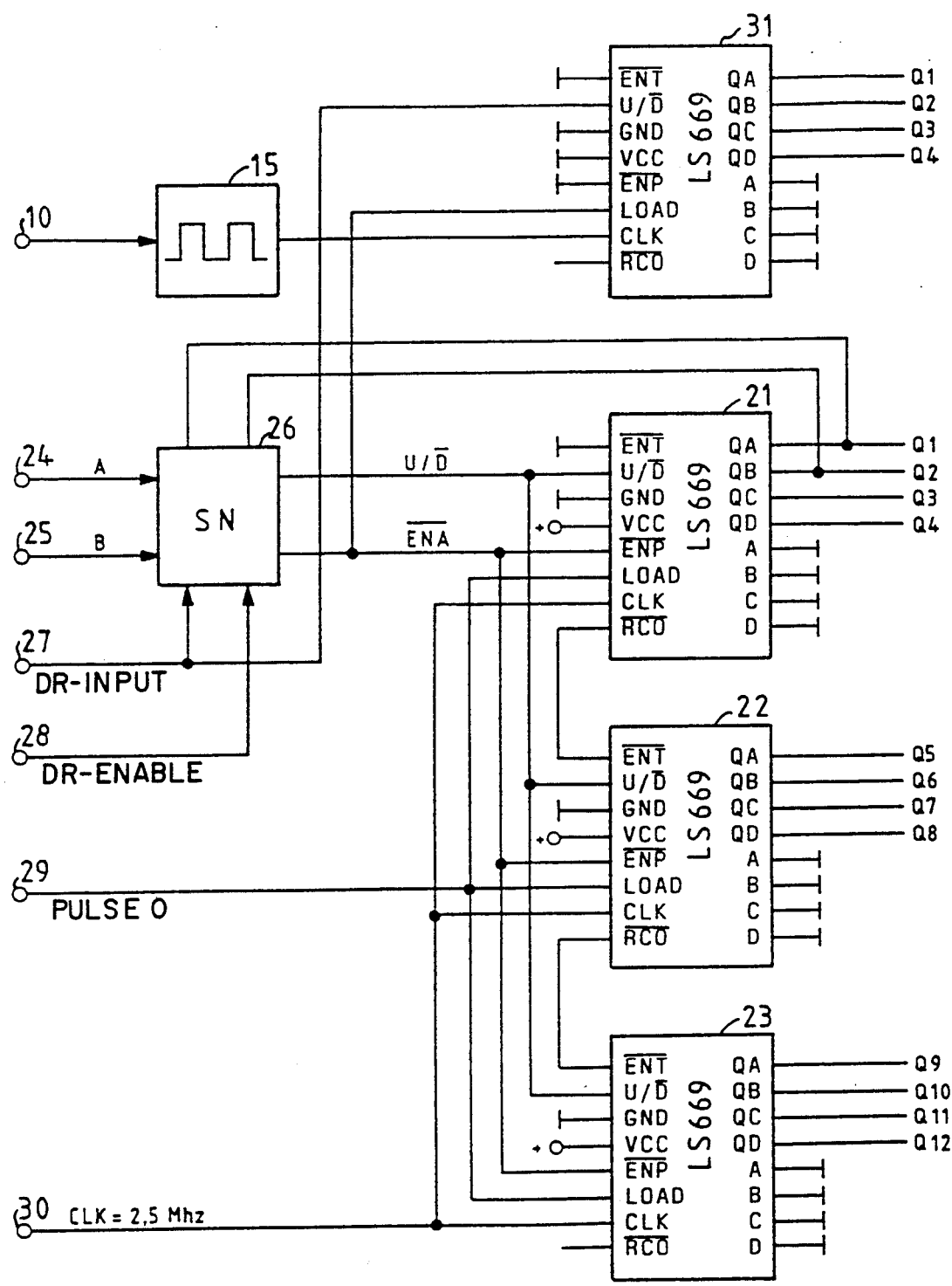
FIG. 3 is another circuit of a counter.

As previously explained hereinbefore in conjunction with FIG. 1, the extent or degree of resolution in measuring the position may be increased with the aid of an oscillator 15 by which further pulses are generated having a frequency which is a multiple of the frequency of the clock signals. In the embodiment of a counter circuit shown in FIG. 3, the oscillator 15 generates pulses having a frequency 64 times that of the angular-speed signals, these generated pulses being fed to a further counter 31 of the type LS 669. The counting direction of the further counter 31 is controlled by the signal DR-input. Thus, the count is extended to 16 places (Q1' to Q4', Q1 to Q 12) and the degree of resolution is increased 16-fold, because a four-fold counting frequency has already been obtained by the evaluation of both edges of the angular-speed signals A and B.

With graduations of 1,024 pulses per full circle, the angular resolution is, accordingly, $360/4,096 = 0.0879$ degrees without the further counter 31, and $360/(4,096 \times 16) = 0.0055$ degrees with the further counter 31.

Figure 4:
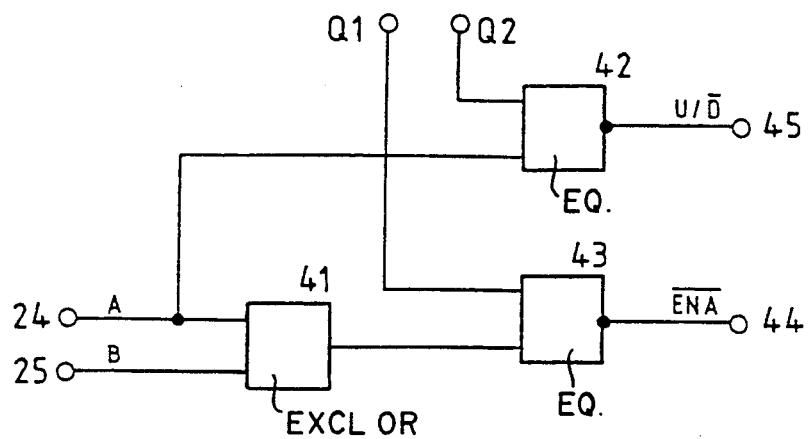
FIG. 4 is a combinatorial circuit which is part of the circuits shown in FIGS. 2 and 3.

FIG. 4 illustrates an embodiment of the combinatorial circuit 26 in which the signals DR-enable and DR-input are not taken into consideration. The combinatorial circuit includes an exclusive-OR element or circuit 41 as well as two equivalence elements or circuits 42 and 43. The angular-speed signals A and B are fed via the respective inputs 24 and 25 to both inputs, respectively, of the exclusive-OR element 41. The output of the exclusive-OR element 41 is connected to one input of the equivalence element 43, another input of which is connected to a least-significant bit (LSB) Q1. The enable signal $\overline{ENA}$ for the counter can be picked off at the output 44 of the equivalence element 43. In order to obtain an up/down signal $U/\overline{D}$, the angular-speed sign A as well as a second least-significant digit or bit Q2 of the count is fed to the equivalence element 42 which has an output 45 from which the signal $U/\overline{D}$ can be picked off.

Figure 5:
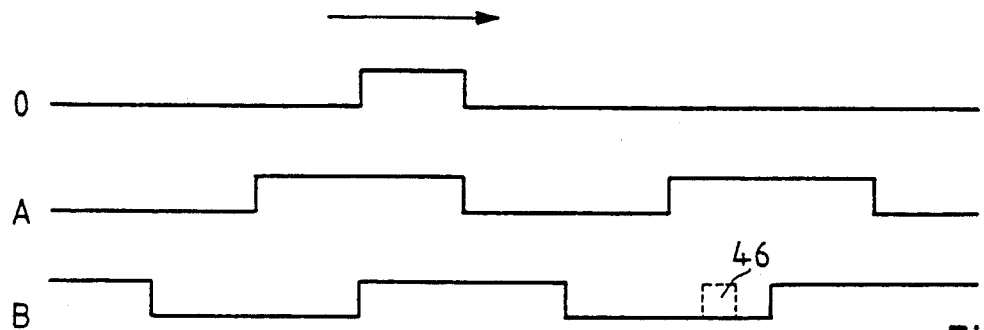
FIG. 5 is a collection of timing diagrams of several signals used in the counter shown in FIG. 2.

The operating principle or function of the combinatorial circuit shown in FIG. 4 in conjunction with the counter shown in FIG. 2 is explained in greater detail hereinafter with reference to FIG. 5. FIG. 5 shows timing or time rate-of-change diagrams for signals 0, A and B for a given direction of rotation, for example, for clockwise rotation. Furthermore, values for Q1 and Q2 of the counter 21 and the entire count Q1 to Q12 are given in FIG. 5. Finally, the count Q1' to Q4' (FIG. 3) is indicated.

The signal 0 occurs once during each revolution, whereas the angular-speed signals A and B occur more frequently, depending upon the divisions of the incremental pulse generator, for example, 1,024 times per revolution. The angular-speed signals A and B are phase-shifted 90° with respect to one another. The counter is reset by the pulse 0, so that the count becomes 0 and, therefore, the two less significant figures or bits Q1 and Q2 also assume the value 0. After the first subsequent edge of the angular-speed signal A, the signals A and B become different, so that the value 1 is present at the output of the exclusive-OR element 41. By the interconnection with Q1=0 in the equivalence element or circuit 43, the output 44 likewise becomes 0, which effects the enabling of the counter. Because Q2=0 and A becomes=0 at this time, $U/\overline{D}$ becomes=1, which effects an incrementation of the counter (counting up).

The incrementation of the counter makes Q1=1, which, in turn, with the following edge of the angular-speed signal B, results in the equality of the angular-speed signals A and B to $\overline{ENA}=0$, so that there is a further incrementation of the counter.

At the beginning of the subsequent quarter-period of the angular-speed signals, the signal A jumps to 1. Because Q2 is likewise=1, however, $U/\overline{D}$ becomes=1. Because A and B, furthermore, are different, but Q1=0, therefore $\overline{ENA}=0$, so that the counter is once again incremented.

Figure 6:
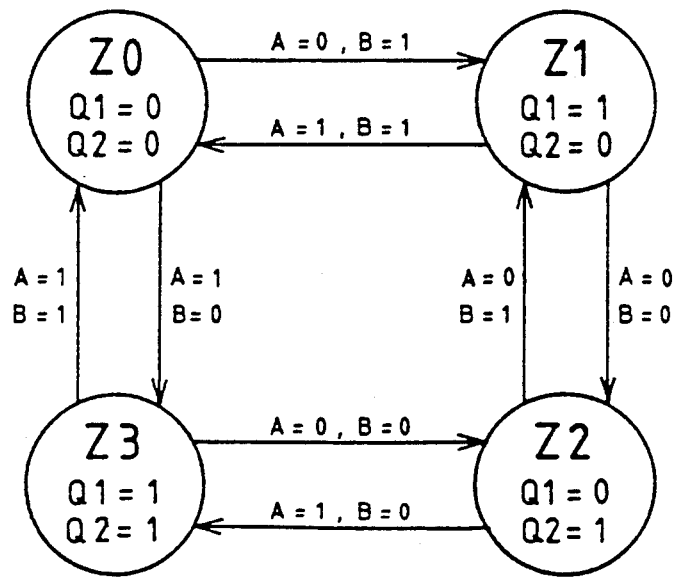
FIG. 6 is an automata graph which explains the function or operating principle of the combinatorial circuit.

In order further to explain the operating principle or function of the combinatorial circuit shown in FIG. 4 in conjunction with the counter circuit, particularly with the counter 21 (FIG. 2), reference is made hereinafter to the automata graph shown in FIG. 6. According thereto, the combinatorial circuit 26, including the less significant bits or figures of the counter 21, can assume the states Z0, Z1, Z2 and Z3. The values present in these states at the outputs Q1 and Q2 are given in the circles representing the states. A transition from one state to another can be effected only by counting up and counting down, respectively, which is indicated in FIG. 6 by arrows between the circles. In this connection, the figures adjacent to the arrows signify the values of the angular-speed signals A and B necessary for the respective transition. Thus, for example, a transition from the state Z0 to the state Z1 is caused by A=0 and B=1. If, afterwards, B becomes=0, there is a transition of the combinatorial circuit to the state Z2.

The filter effect of the combinatorial circuit is explained with reference to an example of a spurious pulse 46 (FIG. 5). Prior to the spurious pulse, the combinatorial circuit is in the state Z3. Due to the fact that, during the spurious pulse 46, the angular-speed signal B assumes the value 1, there is a switch-over to the state Z0, because the angular-speed signal A=1 also. At the end of the spurious pulse, however, B again becomes=0, with the result that the combinatorial circuit is reset to the state Z3. The counter is, therefore, incremented by the spurious pulse 46; after the spurious pulse, however, the counter is again decremented, with the result that there is no falsification of the count.

The effect of the combinatorial circuit shown in FIG. 4 is, therefore, that, in any state, only the respective adjacent states are allowed. The count 0 can, therefore, be followed only by one of the counts 1 or 4,095. A further increase in operational reliability is achieved by the inputting of the direction of rotation via the computer 3 (FIG. 1). In this connection, a change in the direction of rotation indicated by the angular-speed signals A and B is recognized as an error by this is in contradiction with the DR-input signal that has been supplied by the computer. When the machine is stationary or revolving at low rotational speeds, however, this additional check may lead to errors and is, therefore, switched off if, because of low rotational speeds, a change of direction of rotation is possible. The computer, therefore, supplies a further DR-enable signal which, above a given rotational speed, assumes the value 1.

Figure 7:
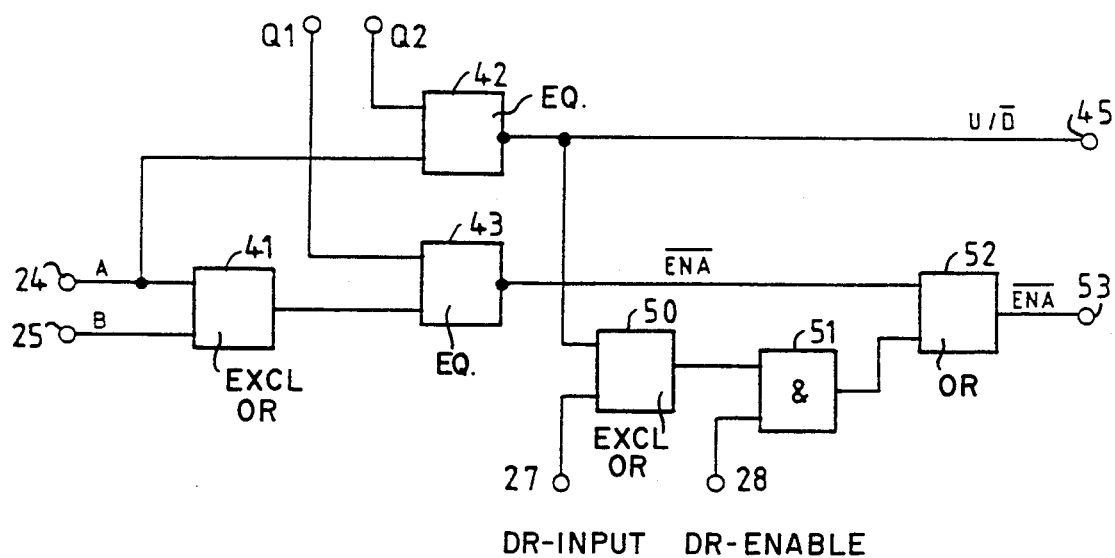
FIG. 7 is a block diagram of another combinatorial circuit.

The combinatorial circuit shown in FIG. 7 contains, in addition to the components previously described in conjunction with FIG. 4, an exclusive-OR element 50, an AND element 51 and an OR element 52. The output signal $\overline{ENA}$ of the equivalence element 43 which, with the combinatorial circuit according to FIG. 4, disables ($\overline{ENA}=1$) or enables ($\overline{ENA}=0$) the counter, is delivered to one input of and once again filtered by an OR element 52 in the combinatorial circuit shown in FIG. 7. The output signal $\overline{ENA}'$ of this OR element 52 is fed via the output 53 to the counter. If the value 0 is present at the other input of the OR element 52, $\overline{ENA}'$ becomes $=\overline{ENA}$, with the result that the combinatorial circuit shown in FIG. 6 operates like the combinatorial circuit shown in FIG. 4. If, however, there is a 1 at the other input of the OR element 52, the output 53 is set to 1 irrespective of the value of $\overline{ENA}$, which effects a disabling of the counter.

This disabling of the counter can, however, take place only of both inputs of the AND element 51 are supplied with the value 1. This is the case if both the signal DR-enable has the value 1 and also the two signals identifying the direction of rotation U/D and DR-input which were obtained independently of one another are different from one another.

The foregoing is a description corresponding in substance to German Application P 38 15 534.6, dated May 6, 1988, the International priority of which is being claimed for the instant application, and which is hereby made part of this application. Any material discrepancies between the foregoing specification and the aforementioned corresponding German application are to be resolved in favor of the latter.

We claim:

1. System for determining the position of movable machine parts, including an incremental pulse generator for generating two concurrent trains of angular-speed pulses shifted 90° out of phase with one another and a pulse per revolution, comprising a computer, and at least one counting circuit via which the incremental pulse generator is connected to said computer for counting the generated angular-speed pulses, including a comparator having respective inputs connected to an output of said counting circuit for receiving a count signal therefrom, and to an output of said computer for receiving a given value signal therefrom, said comparator having an output connected to another input of said computer for feeding a program-interrupt signal thereto.

2. System according to claim 1, including means for deriving further pulses having a frequency which is a given multiple of the frequency of the angular-speed pulses, and wherein said one counting circuit has means for receiving and counting said further pulses instead of the angular-speed pulses.

3. System according to claim 1, wherein said counting circuit includes a plurality of counters, and including means for deriving further pulses having a frequency which is a given multiple of the frequency of the angular-speed pulses, the incremental pulse generator being connected to at least one of said counters for delivering output signals thereto forming more significant figures of the count, said means for deriving further pulses being connected to a further one of said counters for delivering an output signal thereto forming less significant figures of the count.

4. System according to claim 2, including a device for measuring the speed of the machine, said computer having means for computing the frequency of said further pulses.

5. System according to claim 1, including a combinatorial circuit connected to said counting circuit and via which the two 90° phase-shifted angular-speed pulses are fed to said counting circuit.

6. System according to claim 5, including means for combining the angular-speed pulses in said combinatorial circuit in a manner that the angular-speed pulses are counted only if a permissible combination of the angular-speed pulses exists.

7. System according to claim 1 wherein the counting circuit has a plurality of counters, and wherein at least one of said counters is respectively incremented and decremented both from front edges and rear edges of the angular-speed pulses of two phase-shifted angular-speed signals.

* * * * *